United States Patent
Sezer et al.

(10) Patent No.: US 11,847,778 B2
(45) Date of Patent: Dec. 19, 2023

(54) IMAGE CAPTURE TECHNIQUES PERSONALIZED TO INDIVIDUAL SUBJECTS BEING IMAGED

(71) Applicant: Apple Inc., Cupertino, CA (US)

(72) Inventors: Osman G. Sezer, Cupertino, CA (US); Vinay Sharma, Cupertino, CA (US); Alok Deshpande, Cupertino, CA (US); Abhishek Singh, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 98 days.

(21) Appl. No.: 16/999,236

(22) Filed: Aug. 21, 2020

(65) Prior Publication Data
US 2022/0058795 A1 Feb. 24, 2022

(51) Int. Cl.
*G06T 5/50* (2006.01)
*G06T 7/00* (2017.01)
(Continued)

(52) U.S. Cl.
CPC .......... *G06T 7/0012* (2013.01); *G06T 3/40* (2013.01); *G06T 5/002* (2013.01); *G06T 5/009* (2013.01);
(Continued)

(58) Field of Classification Search
CPC ......... G06T 7/0012; G06T 3/40; G06T 5/002; G06T 5/009; G06T 5/50;
(Continued)

(56) References Cited

U.S. PATENT DOCUMENTS

| | | | |
|---|---|---|---|
| 8,379,130 B2 * | 2/2013 | Forutanpour | G11B 27/34 348/333.01 |
| 2010/0202699 A1 * | 8/2010 | Matsuzaka | G06T 11/001 382/307 |

(Continued)

FOREIGN PATENT DOCUMENTS

CN 107180415 A * 9/2017

OTHER PUBLICATIONS

Joshi, Neel, et al. "Personal photo enhancement using example images." ACM Trans. Graph. 29.2 (2010): 12-1. (Year: 2010).*
(Continued)

*Primary Examiner* — Amandeep Saini
*Assistant Examiner* — Denise G Alfonso
(74) *Attorney, Agent, or Firm* — BakerHostetler

(57) ABSTRACT

Methods and apparatuses are disclosed to personalize image capture operations of imaging equipment according to models that correspond uniquely to subjects being imaged. According to these techniques, a subject's face may be detected from a first image supplied by an image source and a first model of the subject may be developed from the detected face. The first model of the subject may be compared to another model of the subject developed from other images. Image adjustment parameters may be generated from a comparison of these models, which may control image adjustment techniques that are applied to the newly captured image of the subject. In this manner, aspects of the present disclosure may generate image capture operations that are tailored to characteristics of the subjects being imaged and avoid artifacts that otherwise could cause image degradation.

28 Claims, 3 Drawing Sheets

(51) Int. Cl.
  *G06T 5/00* (2006.01)
  *G06T 3/40* (2006.01)
(52) U.S. Cl.
  CPC ...... *G06T 5/50* (2013.01); *G06T 2207/10016* (2013.01); *G06T 2207/10024* (2013.01); *G06T 2207/30201* (2013.01)
(58) Field of Classification Search
  CPC . G06T 2207/10016; G06T 2207/10024; G06T 2207/30201
  See application file for complete search history.

(56) References Cited

U.S. PATENT DOCUMENTS

| | | | | |
|---|---|---|---|---|
| 2013/0235232 A1* | 9/2013 | Yang | ............... | H04N 5/2355 348/229.1 |
| 2016/0065864 A1* | 3/2016 | Guissin | ............... | G06T 5/50 348/239 |
| 2016/0212355 A1* | 7/2016 | Pouli | ............... | H04N 23/741 |
| 2017/0085785 A1* | 3/2017 | Corcoran | ............... | H04N 5/23229 |
| 2020/0250406 A1* | 8/2020 | Wang | ............... | G06K 9/628 |
| 2021/0396583 A1* | 12/2021 | Price | ............... | A61B 5/01 |

OTHER PUBLICATIONS

Shu, Zhixin, et al. "Eyeopener: Editing eyes in the wild." ACM Transactions on Graphics (TOG) 36.1 (2016): 1-13. (Year: 2016).*

Süsstrunk, Sabine, Clément Fredembach, and Daniel Tamburrino. "Automatic skin enhancement with visible and near-infrared image fusion." Proceedings of the 18th ACM international conference on Multimedia. 2010. (Year: 2010).*

Kahraman et al., "Active Illumination and Appearance Model for Face Alignment", Turk J. Elec & Comp Sci, 2010, vol. 18, No. 4, pp. 667-692.

Sun et al., "Single Image Portrait Relighting", ACM Trans. Graph., Jul. 2019, vol. 38, No. 4, article 79, 12 pages.

* cited by examiner

100

200

300

400

IMAGE CAPTURE TECHNIQUES PERSONALIZED TO INDIVIDUAL SUBJECTS BEING IMAGED

BACKGROUND

The present disclosure relates to image capture techniques in electronic devices and, in particular, to image capture and processing techniques that perform image adjustments such as "retouching" operations.

Many modern consumer electronic devices have imaging capabilities. It is a common experience, for example, to use smartphones, tablet computers, and laptop computers to capture images of individuals. The images often are stored for later review, consumed by applications executing on the device, and/or exchanged with other devices to support services such as videoconferencing.

Imaging capture operations often apply image enhancements that alter characteristics of the images captured by cameras within such devices. While processes that alter image brightness, filter noise, and the like can improve the perceived quality of images when properly applied, they can degrade the perceived quality of such images when they are applied improperly. Such operations, for example, can induce color distortions or other aberrations that cause images of human subjects to appear unnatural.

DETAILED DESCRIPTION

Aspects of the present disclosure provide methods and apparatuses to personalize image capture operations according to models that correspond uniquely to the subjects being imaged. According to these techniques, a subject's face may be detected from a first image supplied by an image source and a first model of the subject may be developed therefrom. The first model of the subject may be compared to other model(s) of the subject developed from other images. Image adjustment parameters may be generated from a comparison of these models, which may control image adjustment techniques that are applied to a newly-captured image of the subject. In this manner, aspects of the present disclosure may generate image capture operations that are tailored to characteristics of the subjects being imaged and avoid distortions that otherwise could cause image degradation.

Figure 1:
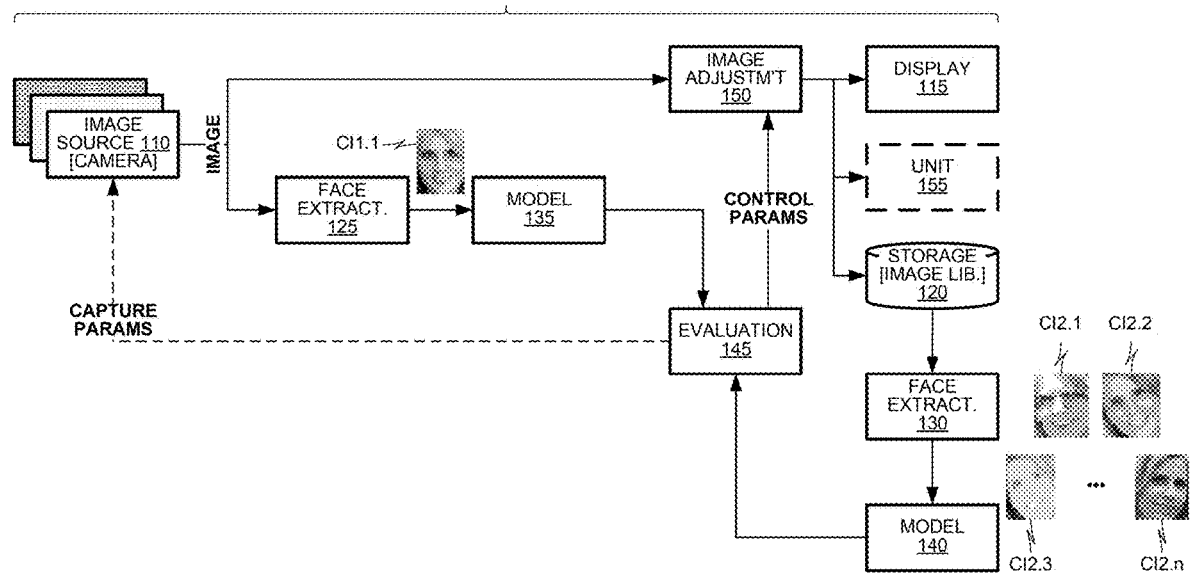
FIG. 1 illustrates a system according to an aspect of the present disclosure.

FIG. 1 is a functional block diagram of a system 100 according to an aspect of the present disclosure. The system 100 may include one or more image source(s) 110, a display 115, and a storage system 120. An image source 110 may capture image(s) of a local environment in which the system 100 is used, which may be output to other system components such as the display 115 and/or storage system 120. The storage system 120 may store an image library representing stored images (not shown), which may have been captured by or otherwise input to the system 100. The display 115 may display images captured by the system 100 including, for example, real-time display of images captured by an image source 110 or display of images retrieved from storage 120. The system 100 may be embodied in a consumer electronic device such as a smartphone (as shown), a personal computer, a notebook computer, a tablet computer, a personal entertainment device, a gaming platform, a computer server, or other system that processes image data. For purposes of the present discussion, the type of electronic device is immaterial unless otherwise noted herein.

The image source 110 may include one or more camera systems that capture images representing a local environment. Many consumer electronic devices include multiple camera systems, which often differ from each other in terms of their fields of view and optical characteristics. For example, many portable consumer devices have camera systems oriented to capture different fields of view from each other (e.g., front-side cameras and back-side cameras). Many consumer devices also have multiple camera systems that are oriented to capture overlapping fields of view (e.g., two or more cameras that face the same direction) but have different operating characteristics such as different pixel resolutions, different field of view widths, and different optical characteristics. It also may occur that a single camera will be driven by different excitation sources during imaging; for example, a common camera may be used in conjunction with a visible light flash source or with an infra-red excitation source under different operating conditions. Thus, the character of images output from a single camera may vary from image to image.

The system 100 may include components that provide the personalized image treatment of the present disclosure. They may include face extraction units 125, 130, and modeling units 135, 140 that operate on images from the image source 110 and image library 120, respectively. The system 100 also may include an evaluation system 145 that compares subject models generated by the modeling systems 135, 140 and outputs control parameters to an image adjustment unit 150. The image adjustment unit 150 may alter image content from an image source 110 according to the control parameters. Altered image(s) may be output to other system components, such as the display 115, the storage system 120, and/or other components 155 as application needs dictate. For example, altered images may be output to video conferencing applications within the system 100 (represented as unit 155), which may perform additional processing on such altered images to compress the image and transmit it to another device. Similarly, other applications (also represented by unit 155), such as graphics compositional applications, gaming applications and the like, may consume the altered images for their purposes.

The face extraction units 125, 130 may extract content of faces from input image content. Typically, the face extraction units 125, 130 may output image content C1.1, CI2.1-CI2.n from their source images that are cropped to fit content of faces recognized from within the image content. With respect to image content output from an image source 110, a face extraction unit 125 may perform face recognition processes in real-time on the image content as it is output from the respective image source 110. While it is permissible for the face extraction 130 unit to operate in real-time on image(s) stored in the image library, face extraction processes 130 may be performed in an "off-line" mode before an image capture event with the image source(s) is started. In such an aspect, subject faces may be identified by face recognition processes or they may be identified by system 100 operators, and metadata identifying spatial location(s) of the faces within images may be stored in storage 120 along with the images themselves. In such an aspect, the face extraction unit 130 may output image content of a face according to spatial locations identified by the metadata.

The modeling units 135, 140 may generate data representing models of the face(s) output by their respective face extraction units 125, 130. The modeling units 135, 140 may, for example, generate data representing spatial locations of facial landmarks in the image content, models of face geometry, skin tone analyses, facial semantics representing a facial expression (e.g., smiling, frowning, blinking) or an emotion (happiness, anger, ambivalence) represented by such expression(s). The modeling units 135, 140 may include machine learning systems, such as neural networks, that are trained to recognize such expression and/or emotion semantics from training images (not shown). As with the face extraction unit 130, the modeling unit 140 may operate in an off-line mode and models generated from image data may be stored within storage 120 for direct use by other system components.

For landmark detection, the modeling units 135, 140 may develop a mesh model of each face represented in the cropped images CI1.1, CI2.1-CI2.$n$ according to predetermined features of the face, called "landmarks," for convenience. As a coarse example, the modeling units 135, 140 may measure spatial characteristics of the eyes within a cropped image (say, CI2.1)—their width, height, shape, spacing from each other, size of the iris, etc. Similarly, the modeling units 135, 140 may perform measurements to characterize the shape of other facial features, such as the subject's the nose, mouth, ears, jawline, etc., and distance of these features from each other. Mesh models vary in complexity based on the number of data points that are used to represent the human face with some models utilizing several hundred data points and others utilizing several thousand data points. The modeling units 135, 140 may identify and measure from image data locations of a subset of those mesh data points that can be detected most readily. In practice, the number and type of mesh data points to be measured may be selected by system designers as they tailor the system 100 for their individual needs.

As discussed, the modeling units 135, 140 may recognize an expression from an input image CI1.1 or CI2.1 based on measured spatial features of the subject. Typically, some measured data points of a subject whose face is relaxed (or stony-faced) may change when the subject changes expression by, for example, smiling, frowning, when the subject is surprised, etc. Typically, eye shape, mouth shape, and perhaps eyebrow orientation will change between various different expressions. The modeling units 135, 140 may assign expression classifications to the image(s) based on such spatial measurements. The modeling units 135, 140 also may operate according to a machine learning algorithm such as a neural network (not shown) that has been trained to recognize such expressions from a training set of input images. In an embodiment, the modeling units 135, 140 may assign multiple expression classifications to images that exhibit characteristics of blended expressions (e.g., half-smiling).

In an embodiment, the modeling units 135, 140 also may identify from the input image(s) CI2.1-CI2.$n$ characteristics of physical, non-spatial attributes of the subject including, for example, the subject's skin tone, hair color, hair type, eye color, whether the subject wears glasses, and/or whether the subject has a beard. Skin tone estimates may be derived from sampling of color information contained within an image area representing the subject's face factoring analyses of overall image brightness, image contrast and tone. Similarly, hair color and eye color estimates may be derived by sampling color information contained within image areas representing those elements of the subject's face, factoring, again, analyses of overall image brightness, image contrast and tone. Characteristics of hair type may be made from estimates of color within an image area corresponding to the subject's hair, an estimated shape of the hair, texture of image content within the image area and the like. The presence of eye glasses and/or a beard may be estimated from image analyses representing such elements. When a beard is detected, estimates of the beard's color and its shape may be modeled.

The modeling units 135, 140 also may develop comprehensive subject models from a plurality of images each of which may represent the subject from a single point of view. For example, separate sets of geometric models of a subject may be derived from images representing the right-hand side of the subject's face, and other sets of geometric models of the subject may be from images representing the left-hand side of the subject's face and from the front of the subject's face. The modeling units 135, 140 may integrate the geometric models developed from various partial views of the subject to generate a comprehensive, full-face model of the subject.

The modeling units 135, 140 may generate data representing, for example, overall image brightness, and/or white balance. Such image characteristic data may provide baseline(s) from which to compare face data CI1.1 extracted from the images output by the image sources 110.

When multiple images of a subject are available from the image library 120, modeling data may be aggregated across multiple images CI2.1, C2.2, C2.3, . . . , CI2.$n$, if available, in which the subject appears. The modeling unit 140, therefore, may output an aggregate model of the subject representing the subject perhaps across a variety of facial expressions and/or a variety of ambient capture circumstances. For example, a subject's skin tone often varies under different lighting circumstances as may occur when a subject is imaged in sunlight or artificial light, when the subject is imaged in bright lighting or dim lighting, and when a subject is imaged in the presence of colored reflective light sources. In an aspect, rather than generate a model that represents the subject with a single skin tone, the model may represent the subject's skin tone across a range of ambient lighting conditions. As with the face extraction unit 130, operation of the modeling unit 140 may be performed in an off-line mode prior to an image capture event and, therefore, modeling data and metadata generated therefrom may be generated and stored in storage 120 before operation of an image source 110 begins. The modeling data and metadata, therefore, may be output from storage 120 directly to an evaluation unit 145 for processing as the face extraction unit 125 and modeling unit 135 operates on image data output from the image source 110.

It often will occur that an image source 110 outputs multiple images of a subject. For example, in a still-imaging application, an image source 110 often will generate a stream of preview images representing the subject as a system operator (perhaps the subject herself) frames the image, poses the subject, and performs other compositional operations prior to commanding the system 100 to capture an image. The preview images typically are displayed on a display 115 of the system 100, which aids the system operator to compose the image. When the operator commands the system 100 (input not shown) to capture an image, the system 100 selects one of the images from the stream output by the image source to be stored in the image library 120.

In an aspect, the modeling operations described hereinabove may be performed on the preview stream of images output by the image source 110. It may occur, for example, that a subject's orientation may change with respect to the image source 110 during image composition, which may cause the image source 110 to capture images of the subject from different views (e.g., right-hand side views, left-hand side views, and/or frontal views as discussed above). In such events, the modeling unit 135 may generate models for the different views, and it may aggregate model information as discussed. It may occur that a subject's expression will change during image composition; here again, the modeling unit 135 may develop and aggregate models representing a subject's expression as they change. It also may occur that lighting conditions will change as the image source 110 generates preview images from which the modeling unit 135 may generate estimates of physical characteristics (e.g., skin tone, etc.) under such lighting conditions and develops models representing changes of such measured physical characteristics under different lighting conditions that occur when an image captured command is entered.

The evaluation unit 145 may compare the models and metadata generated by the modeling units 135, 140 and compare them. The evaluation unit 145 may determine a set of control parameters that may be applied by the image adjustment unit 150 to images output from the image source 110. Image adjustments may include, for example, changes in image composition, changes of image brightness, changes in image resolution, application of image filtering, and the like. Such applications are described hereinbelow.

In an aspect, an evaluation unit 145 may use skin tone estimates derived from preview images and from library images to alter image brightness. Images, for example, that are underexposed or backlit often represent a subject with poor fidelity, which can be improved by "relighting" image content representing the subject (e.g., modifying image brightness). In such applications, an evaluation unit 145 may control operation of relighting algorithms to cause subject skin tone generated therefrom to match skin tone of stored images having image brightness that are correlated to the brightness of the adjusted image. For example, the evaluation unit 145 may develop color transforms from the skin tone data of a preview image and skin tone data of library image(s) to be applied by the image adjustment unit 150 as it alters image brightness.

In another aspect, the evaluation unit 145 may derive color transforms of image content based on comparisons of white balance values derived from the captured images and from library images. Often, when a subject is imaged in the presence of a first light source (for example, fluorescent lighting) the light source may distort a representation of the subject within a captured image. The evaluation unit 145 may compare a skin tone model of the subject in the captured image to skin tone model(s) of the subject in library images representing the subject in other lighting conditions, such as natural light, and may derive a color transform to alter the subject's representation in the captured image to correspond to a representation under natural lighting.

Similarly, when a subject is placed in close proximity to a colored structure (e.g., a painted wall), light reflected from the structure may induced colored distortions in the representation of the subject in captured images. The evaluation unit 145 may compare a skin tone model of the subject in the captured image to skin tone model(s) of the subject in other library images to derive a color transform that alter the subject's representation in the captured image to counteract distortions of the reflective surface.

In a further aspect, the evaluation unit 145 may derive color transforms of image content based on data from the modeling unit 140. When participating in a video conferencing session in low light environment, it may be convenient to capture an image of a subject using a visible light flash, which may be stored in the image library 120, and thereafter capture images of the subject using an infra-red excitation source. The evaluation unit 145 may develop color transforms to be applied by the image adjustment unit 150 to transform images containing infra-red image content to colors representing the subject captured under visible light excitation. In such cases, skin tone information of the subject captured under natural light excitation may be compared with skin tone information of the subject captured under the infra-red excitation to derive appropriate color transforms. Moreover, the evaluation unit 145 may derive image shading effects from depth information derived from geometrical models representing the subject's face.

In another aspect, the evaluation unit 145 may use facial geometry information derived from preview images and from library images to set parameters of denoising filters. Images captured in low light environments often contain large noise components as compared to images captured in bright light environments. The evaluation unit 145 may vary strength of denoising filters according to geometry model information that corresponds to predetermined spatial features modeled from noise-free images of a subject's face present within the image library 120. In such a case, denoising filtering may be more effective at removing noise elements within a captured image and less likely to filter content representing subject facial features.

In another aspect, the evaluation unit 145 may derive geometry transforms to be applied to image content based on geometry information derived from images stored in the image library 120. For example, the evaluation unit 145 may recognize expressions from model information output by the model unit 135 and derive altered models using recognized expressions derived from the model unit 140. The evaluation unit 145 may insert smiles, remove eye blinks, and provide other alterations to images output from the image source 110. Alternatively, the evaluation unit 145 may alter hair type (e.g., remove "bed head" from captured image content), replacing it with hair representations derived from images contained within the image library.

In an aspect, the evaluation unit 145 may derive control parameters to alter resolution of captured images based on geometry information derived from images stored in the image library 120. It may occur that, owing to parameters of the image source 110 or size of an captured face within image data, a face represented in a captured image has relatively low resolution as compared to other representations of the face within the image library 120. Based on comparisons between a low-resolution representation of a subject's face derived by the modeling unit 135 and higher-resolution representations of the subject's face derived by the modeling unit 140, the evaluation unit may synthesize a higher resolution model of the subject's face as represented within the captured image. The higher resolution model may be personalized to the subject because it is derived from models developed from other images of the same subject. The evaluation unit 145 may supply control parameters to the image adjustment unit 150 to synthesize higher frequency details of the subject's face within the captured image.

In a further aspect, the evaluation unit 145 may derive capture control parameters that alter operation of the image source 110. For example, based on analyses of skin tone characteristics, an evaluation unit 145 may alter image exposure settings and/or capture modes of the image source 110. The evaluation unit 145 may, for example, determine exposure settings for image source 110 cameras used in high dynamic range ("HDR") capture modes, where two image capture operations are performed for a single frame using a long exposure setting that improves signal to noise ratio in dark regions of image content and a short exposure setting that prevents image saturation in brightly-lit regions of image content. Control parameters from the evaluation unit 145 may engage HDR capture modes based on analysis of image content and/or adjust exposure settings during non-HDR capture modes.

Figure 2:
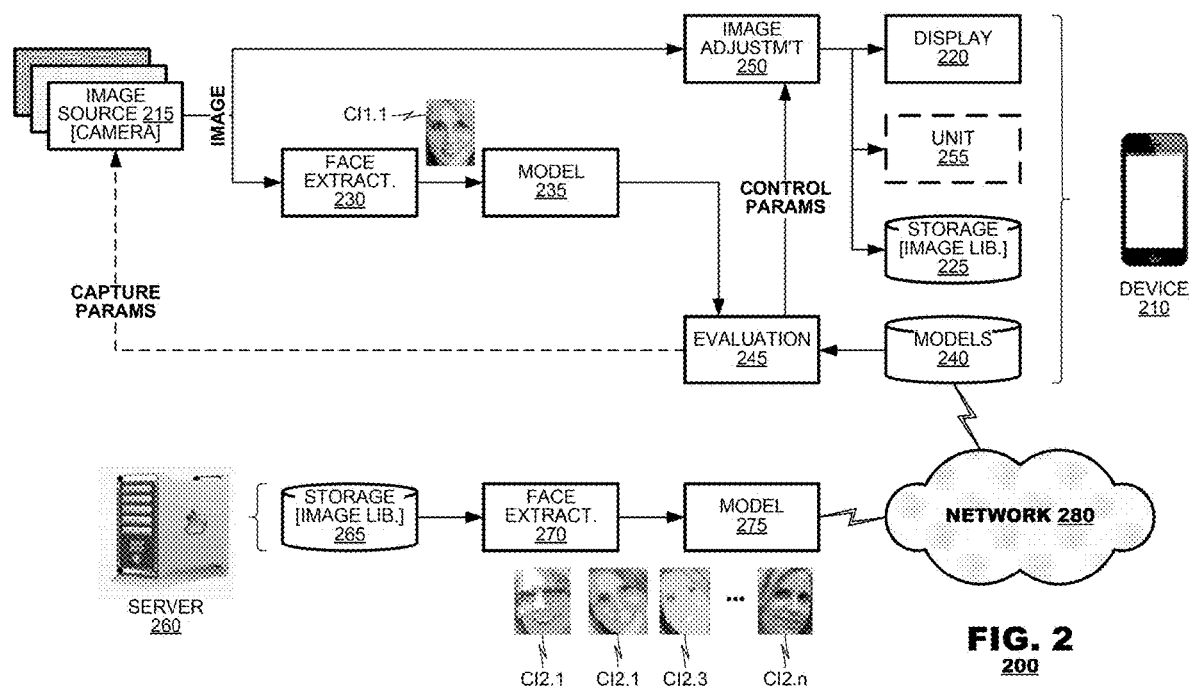
FIG. 2 illustrates a system according to an aspect of the present disclosure.

FIG. 2 illustrates a system 200 according to an aspect of the present disclosure. The system 200 may include a client device 210 and a server 270 provided in mutual communication by a network 290. The client device 210 may include one or more image source(s) 215, a display 220, and a storage system 225. The image source 215 may capture image(s) of a local environment in which the client device 210 is used, which may be output to other system components such as the display 220 and/or storage system 225. The storage system 225 may store an image library representing stored images (not shown), which may have been captured by or otherwise input to the client device 210. The display 220 may display images captured by the client device 210 including, for example, real-time display of images captured by an image source 215 or display of images retrieved from storage 225. The client device 210 may be embodied as a consumer electronic device such as a smartphone (as shown), a personal computer, a notebook computer, a tablet computer, a personal entertainment device, a gaming platform, a computer server, or other system that processes image data. For purposes of the present discussion, the type of electronic device is immaterial unless otherwise noted herein.

The image source 215 may include one or more camera systems that captured images representing a local environment. Many consumer electronic devices include multiple camera systems, which often differ from each other in terms of their fields of view and optical characteristics. For example, many portable consumer devices have camera systems oriented to capture different fields of view from each other (e.g., front-side cameras and back-side cameras). Many consumer devices also have multiple camera systems that are oriented to capture overlapping fields of view (e.g., two or more cameras that face the same direction) but have different operating characteristics such as different pixel resolutions, different field of view widths, and different optical characteristics. It also may occur that a single camera will be driven by different excitation sources during imaging; for example, a common camera may be used in conjunction with a visible light flash source or with an infra-red excitation source under different operating conditions. Thus, the character of images output from the image source 215 may vary from use case to use case.

The client device 210 may include components that provide the personalized image treatment of the present disclosure. They may include a face extraction unit 230 and modeling units 235 that operate on images from the image source 215 that operate as discussed in FIG. 1 hereinabove. The client device 210 also may include a model repository 240 that stores modeling data and metadata derived from images stored by the server 270. The client device 210 also may include an evaluation system 245 that compares subject models output by the modeling system 235 and stored by the model repository 240 and generates control parameters for use by an image adjustment unit 250. The image adjustment unit 250 may alter image content from an image source 215 according to the control parameters. Altered image(s) may be output to other system components, such as the display 220, the storage system 225, and/or other components 255 as application needs dictate. For example, altered images may be output to video conferencing applications executed by the client device (represented as 255), which may perform additional processing on such altered images to compress the image and transmit it to another device.

The server 260 may store an image library 265 associated with a user of the client device 210. The image library 265 may but need not contain the same images stored by the client device 210 in storage 225. The server 260 may possess its own face extraction unit 270 and modelling unit 275 that generate modeling data and metadata from images stored in the image library 265. The server 260 may transfer such modeling data and metadata to the client device 210 for storage in the model repository 240 at predetermined intervals. Operation of the face extraction unit 270 and modelling unit 275 may be performed asynchronously with image capture and adjustment operations performed by the client device 210.

It is expected that the server 260 may provide image hosting services for a number of different system users (not shown), who will possess their own client devices 210 and user accounts. In such applications, the server 260 may store several image libraries 265 each associated with separate user accounts. The server 260 also may store personal identification information of the user(s) to which those user accounts relate. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Image capture and adjustment operations may be performed in an analogous manner as described above in connection with FIG. 1. In the aspect illustrated in FIG. 2, although the client device 210 need not store the entirety of an image library 265 from which modeling data and metadata are created, the client device 210 may store a local copy of the modeling data and metadata and a sufficient number of images to permit the client device to detect correlation between an extracted image CI1.1 and modeling data corresponding to the same subject. Based on this correlation, the evaluation unit 245 may derive control parameters for the image adjustment module 250 and/or capture parameters for the image source 215.

Figure 3:
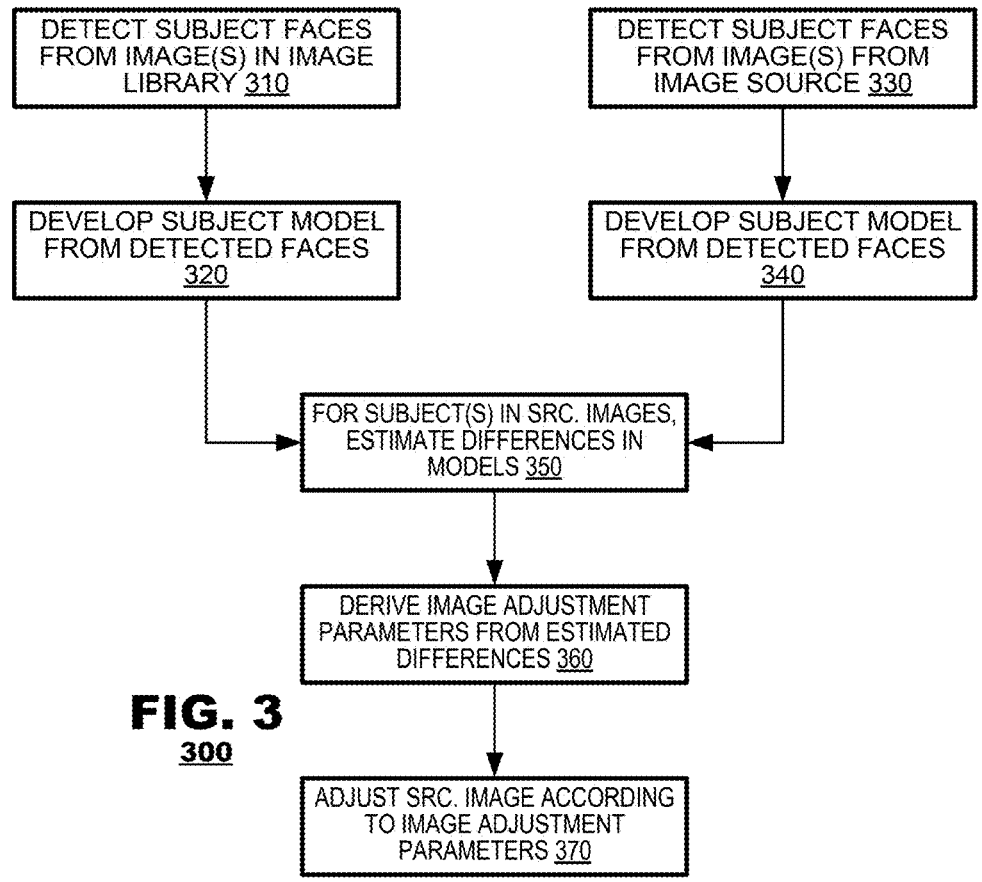
FIG. 3 illustrates a method according to an aspect of the present disclosure.

FIG. 3 illustrates a method 300 according to an aspect of the present disclosure. Portions of the method 300 may operate in asynchronously-performed phases. In a first phase, the method 300 may detect subject face(s) from images stored in an image library (box 310). The method 300 may develop a model representing each subject face from stored images that contain content representing that subject's face (box 320). The operation of boxes 310 and 320 may generate models of multiple subjects if available in the provided images.

In a second phase of operation, the method 300 may detect subject face(s) from images provided by an image source (box 330). The method 300 may develop a model representing each subject face from the provided images (box 340). The operation of boxes 330 and 340 may generate models of multiple subjects if available in the content of the provided images.

The method 300 may estimate differences in models developed for the subject(s) identified in the images provided by the video source (box 350). The method 300 may derive image adjustment parameters from the estimated differences (box 360) and may apply the image adjustments to selected image(s) from the image source (box 370). Derivation of image adjustment parameters and application of image adjustments may occur as discussed hereinabove.

Figure 4:
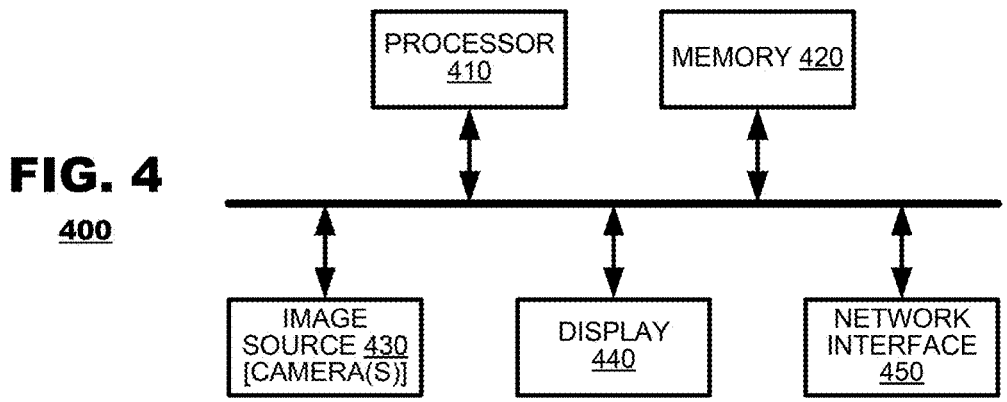
FIG. 4 is a block diagram of a device according to an aspect of the present disclosure.

FIG. 4 is a block diagram of a device 400 according to an aspect of the present disclosure. The device 400 may include a processor 410, a memory system 420, an image source 430, a display 440, and a network interface 450, all provided in mutual communication with one another.

The processor 410 may execute program instructions that perform the operations described in the foregoing FIGS. 1-3, including face extraction, modeling, evaluation and image adjustments. The memory 420 may store such program instructions for execution by the processor. In an aspect, the memory 420 may be provided as a hierarchical memory system, which may include one or more random access memories and/or long-term storage devices (not shown). Such memories may be provided as electrical-, magnetic- and/or optical-storage media. The memory 420 also may store images and image library as discussed hereinabove.

The image source 430 may include one or more cameras and excitation sources as discussed above to capture images representing an environment in which the device 400 is used. As discussed, many modern consumer electronics devices include multiple camera systems provide within them, which may have their own fields of view and intrinsic operating characteristics. Such camera systems may capture images independently of each other in certain operating modes. In other operating modes, multiple camera systems may be used cooperatively to capture images representing their own fields of view that are integrated together to form composite images. The principles of the present disclosure work cooperatively with all such camera systems.

The display 440 may include a display device, such as an LCD or LED display device. The display may display images in real-time as they supplied by the image source 430 and adjusted by the processor 410. Alternatively, the display 440, under control of the processor 410, may display images retrieved from the memory system 420.

The network interface 450 may provide communication with other system devices such as the server 260 (FIG. 2). The network interface 450 may provide include transmitters and receivers transmission and/or reception of data over wireless and/or wireline networks (also not shown) as may be appropriate for the network environment in which the device 400 is to be used.

The foregoing description has presented aspects of the present disclosure in the context of processing devices. Typically, such devices are provided as computer-controlled devices such as personal computers, notebook computers, tablet computers, smartphones, computer servers, personal media players, gaming platforms and/or dedicated videoconferencing equipment. Such devices typically operate using computer processors that execute programming instructions stored in a computer memory system, which may include electrical-, magnetic- and/or optical storage media. Alternatively, the foregoing techniques may be performed by dedicated hardware devices such as application specific integrated circuits, digital signal processors and/or field-programmable gate array. And, of course, aspects of the present disclosure may be accommodated by hybrid designs that employ both general purpose and/or specific purpose integrated circuit. Such implementation differences are immaterial to the present discussion unless noted hereinabove.

Although the disclosure has been described with reference to several exemplary aspects, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and aspects, the disclosure is not intended to be limited to the particulars disclosed; rather the disclosure extends to all functionally equivalent structures, methods, and uses such as are within the scope of the appended claims.

We claim:

1. A method, comprising:
   detecting a subject's face from a first image supplied by an image source,
   developing a first model of the subject from the detected face,
   comparing a first skin tone in the developed model to a second skin tone in a second model of the subject developed from other images;
   generating, from the comparison of skin tones, image adjustment parameters and capture control parameters including control parameter(s) of high dynamic range (HDR) capture modes;
   capturing a second image from the image source according to the capture control parameters for control of HDR capture modes; and
   altering the second image supplied by the image source according to the image adjustment parameters.

2. The method of claim 1, wherein the second subject model represents skin tone of the subject over a range of image brightnesses.

3. The method of claim 1, wherein the second subject model represents geometry of the subject's face over a range of expressions.

4. The method of claim 1, wherein the altering adjusts brightness of the first image according to image adjustment parameters generated from a comparison of skin tone information of the two subject models.

5. The method of claim 1, wherein, when altering applies a color transform to the first image according to image adjustment parameters generated from a comparison of skin tone information of the first subject model and the second subject model.

6. The method of claim 1, wherein the altering applies denoising filtering to the first image according to image adjustment parameters generated from a comparison of geometry of subject facial features of the two models.

7. The method of claim 1, wherein the altering alters an expression of the subject in the first image according to a comparison of geometry of subject facial features of the two models.

8. The method of claim 1, wherein the altering alters a physical characteristic of the subject as represented in the first image according to a comparison of geometry of subject facial features of the two models.

9. The method of claim 1, wherein the altering increases resolution of the detected face within the first image according to the second model representing the subject.

10. The method of claim 1, further comprising altering capture parameters of the image source based on a comparison of the two subject models.

11. The method of claim 1, further comprising altering a plurality of images from the image source according to the image adjustment parameters and displaying the altered images in real-time with capture of the image by the image source.

12. The method of claim 1, further comprising outputting the altered image to an image library.

13. The method of claim 1, further comprising outputting the altered image to a videoconferencing application.

14. The method of claim 1, wherein the first image is an infrared image, the other images include visible light images, and the image adjustment parameters include one or more color transforms to transform the infrared first image into a visible light image.

15. The method of claim 14, wherein the image adjustment parameters include image shading effects from depth information derived from geometrical models representing the subject's face.

16. An apparatus, comprising:
an image source,
a face extractor having an input for a first image output by the image source,
a modeling unit having an input for cropped face data output by the face extractor,
a source of modeling data developed from other images
a model evaluation unit having for comparing a first skin tone in a model output by the modeling unit and a second skin tone in modeling data from the source to produce capture control parameters and image adjustment parameters including control parameter(s) of high dynamic range (HDR) capture modes, and
an image adjustment unit, having an input for a second frame of the image source captured according to the capture control parameters for control of HDR capture modes and the image adjustment parameters output by the model evaluation unit, and an output for an adjusted second image based on adjustments described by the image adjustment parameters.

17. The apparatus of claim 16, wherein the source of modeling data comprises:
storage for an image library, and
a second face extractor having an input for second images stored in the image library, and
a second modeling unit having an input for cropped face data output by the second face extractor.

18. The apparatus of claim 16, wherein the source of modeling data comprises a storage unit for storing the modeling data developed from other images.

19. A non-transitory computer readable medium storing program instructions that, when executed by a processing device, cause the device to perform a method, comprising:
detecting a subject's face from a first image supplied by an image source,
developing a first model of the subject from the detected face,
comparing a first skin tone in the developed model to a second skin tone in a second model of the subject developed from other images;
generating, from the comparison of skin tones, image adjustment parameters and capture control parameters including control parameter(s) of high dynamic range (HDR) capture modes;
capturing a second image from the image source according to the capture control parameters for control of HDR capture modes; and
altering the second image supplied by the image source according to the image adjustment parameters.

20. The medium of claim 19, wherein the altering adjusts brightness of the first image according to image adjustment parameters generated from a comparison of skin tone information of the two subject models.

21. The medium of claim 19, wherein, when altering applies a color transform to the first image according to image adjustment parameters generated from a comparison of skin tone information of the two models.

22. The medium of claim 19, wherein the altering applies denoising filtering to the first image according to image adjustment parameters generated from a comparison of geometry of subject facial features of the two models.

23. The medium of claim 19, wherein the altering alters an expression of the subject in the first image according to a comparison of geometry of subject facial features of the two models.

24. The medium of claim 19, wherein the altering alters a physical characteristic of the subject as represented in the first image according to a comparison of geometry of subject facial features of the two models.

25. The medium of claim 19, wherein the altering increases resolution of the detected face within the first image according to the second model representing the subject.

26. A method, comprising:
detecting a subject's face from a first image supplied by an image source,
developing a first model of the subject from the detected face,
comparing skin tone in the developed model to a second model of the subject developed from other images;
generating, from the comparison of skin tone, capture control parameters including control parameter(s) of high dynamic range (HDR) capture modes and image adjustment parameters, wherein the image adjustment parameters include image shading effects from depth information derived from geometrical models representing the subject's face; and
capturing a second image from the image source according to the capture control parameters for control of HDR capture modes;
altering the second image supplied by the image source according to the image adjustment parameters.

27. The method of claim 26, wherein the second subject model represents a skin tone of the subject in a predetermined brightness condition, and the capture control parameters represent a difference between a skin tone represented in the first model and the second model.

28. The method of claim 26, wherein the second subject model represents a geometry of the subject's face in a predetermined expression condition, and the capture control parameters represent a difference between an expression represented in the first model and the second model.

* * * * *